United States Patent [19]

Abraham

[11] Patent Number: 5,343,838
[45] Date of Patent: Sep. 6, 1994

[54] DUAL RADIUS ROTOR FOR PRE-MIXED-CHARGE ROTARY ENGINE COMBUSTION

[75] Inventor: John Abraham, Parsippany, N.J.
[73] Assignee: Gas Research Institute, Chicago, Ill.
[21] Appl. No.: 99,105
[22] Filed: Jul. 29, 1993
[51] Int. Cl.[5] .................... F02B 55/02; F02B 55/14
[52] U.S. Cl. ................................................ 123/218
[58] Field of Search ........................ 123/218, 242

[56] References Cited

U.S. PATENT DOCUMENTS

| | | |
|---|---|---|
| 3,288,120 | 11/1966 | Lamm et al. |
| 3,606,602 | 9/1971 | Hamada et al. |
| 3,696,796 | 10/1972 | Gavrun |
| 4,066,044 | 1/1978 | Jones et al. |
| 4,067,670 | 1/1978 | Goloff |
| 4,074,614 | 2/1978 | Beals |
| 4,377,136 | 3/1983 | Evans |
| 4,418,663 | 12/1983 | Bentley |
| 5,121,721 | 6/1992 | Bando |
| 5,123,387 | 6/1992 | Jones |

FOREIGN PATENT DOCUMENTS

| | | | |
|---|---|---|---|
| 1551113 | 3/1970 | Fed. Rep. of Germany | 123/242 |
| 60-1327 | 1/1985 | Japan | 123/242 |

OTHER PUBLICATIONS

Abraham, J., et al., "3-D Computations of Premixed-Charge Natural Gas Combustion in Rotary Engines", SAE Technical Paper Series 910625, International Congress and Exposition, Detroit, Mich., Feb. 25–Mar. 1, 1991, SAE International Warrendale, Penn.

Abraham, J., et al., "Pressure Non-Uniformity and Mixing Characteristics in Stratified-Charge Rotary Engine Combustion", SAE Technical Paper Series 880624, International Congress and Exposition, Detroit, Mich., Feb. 29–Mar. 4, 1988, SAE International, Warrendale, Penn.

Yamamoto, K., *Rotary Engine*, Sankaido Co. Ltd., Japan (distributed by the Society of Automotive Engineers), pp. 6, 7, and 19.

*Primary Examiner*—Michael Koczo
*Attorney, Agent, or Firm*—Speckman, Pauley & Fejer

[57] ABSTRACT

A rotary piston for a rotary piston, internal combustion engine, said rotary piston comprising a plurality of contiguous, convex, arcuate peripheral surfaces which, in combination with the engine housing, define combustion-working chambers. Each of the convex, arcuate peripheral surfaces of the rotary piston defines a convex, arcuate rotor recess having a radius greater than the radius of the arcuate peripheral surface of the rotary piston.

6 Claims, 2 Drawing Sheets

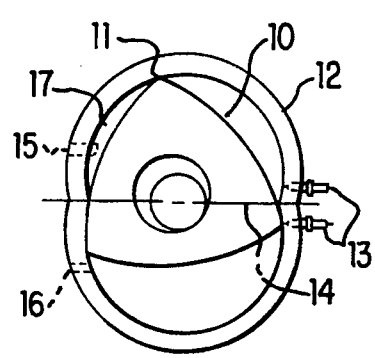
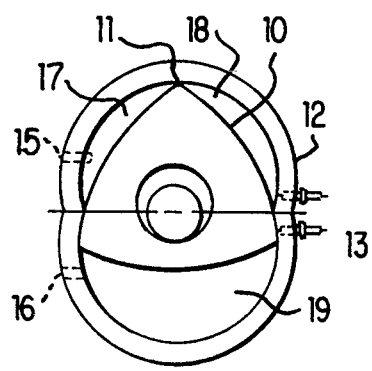
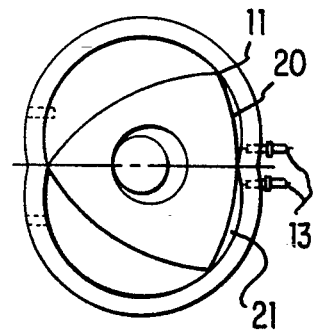
FIG. 1a  FIG. 1b  FIG. 1c
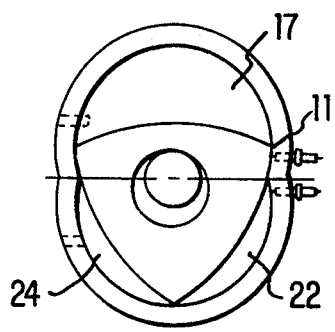
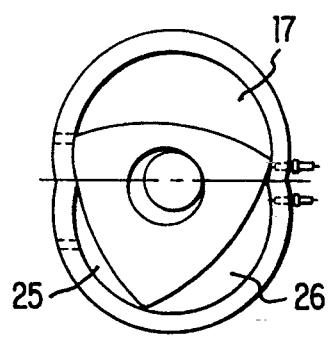
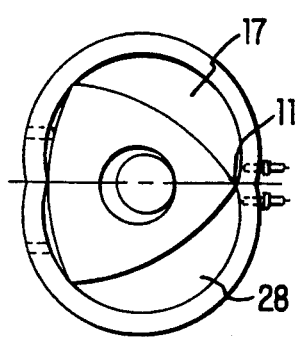
FIG. 1d  FIG. 1e  FIG. 1f
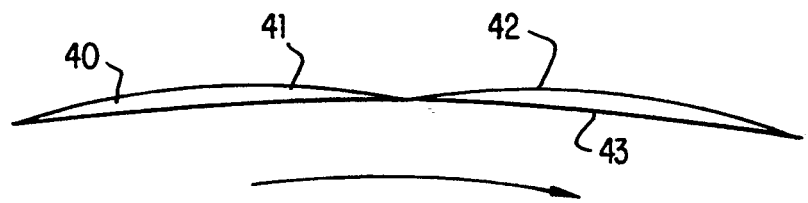
FIG. 2

DUAL RADIUS ROTOR FOR PRE-MIXED-CHARGE ROTARY ENGINE COMBUSTION

BACKGROUND OF THE INVENTION

1. Field of the Invention

This invention relates to a rotary piston, internal combustion engine having a rotary piston eccentrically mounted for rotation in a multi-lobe, trochoidal-shaped engine housing and defining, with the housing, intake, compression, expansion and exhaust working chambers, each of which varies in volume as the rotary piston rotates within the housing in combination with ignition means for initiating fuel combustion disposed within the housing at a point relative to the direction of rotary piston rotation preceding the lobe junction between the compression and expansion combustion-working chambers. The rotary engine utilizes a premixed charge of fuel and air as opposed to a stratified charge. To provide the desired compression ratio, the rotary piston is provided with a rotor recess in each peripheral rotary surface. With known rotor recesses, or pockets, the mixture within the pocket may burn completely while the portions of the charge in the leading, trailing and side edge regions are not completely burned due to quenching. This invention comprises a rotary piston having a pocket design which reduces the volume of the quench zones relative to the quench zones of a rotor having a standard pocket. As a result, the fraction of premixed fuel/air charge that burns completely is substantially greater than with standard rotors. This, in turn, reduces the amount of unburned hydrocarbons emitted through the exhaust and, thus, increases efficiency of the engine. The underlying principal of this invention is that, for premixed charges, the pocket should occupy as great a fraction of the surface of the peripheral surface of the rotor as possible for reduced emissions and increased efficiency.

Description of the Prior Art

Rotary engines, such as the NSU-Wankel type rotary engine, are well known to those skilled in the art. The rotary engine is composed of a housing system, rotation system, intake-exhaust system, cooling system and lubricating system. It does not have a valve mechanism and can only transmit its output power by means of rotary motion. Such rotary engine is described, for example, by Yamamoto, K., *Rotary Engine,* Sankaido Co. Ltd., Japan (distributed by the Society of Automotive Engineers). In operation, a four stroke, one cycle rotary engine continuously performs four distinguishable strokes of intake, compression, expansion and exhaust within the three working chambers defined by the rotor and engine housing. In particular, the intake stroke begins with the opening of an intake port in communication with the intake working chamber through which an air/fuel mixture is introduced into the intake working chamber. Due to the trochoidal-shaped engine housing and the contour of the rotor which is based on the inner envelope of a trochoid, the volume of the intake working chamber gradually expands as the rotor rotates, reaching a maximum volume and automatically closing the intake port. As the rotor continues to rotate, the air/fuel mixture is compressed and ignited and, subsequently, goes into an expansion stroke, having been ignited near the compression top dead center. At this point, the distance between the surface of the rotor and the inner surface of the housing is at a minimum. As the rotor continues to rotate, the combustion products expand in the expansion stroke. After going through the expansion stroke, the exhaust port opens and the combustion products are exhausted. From there, the cycle is repeated. Thus, during one complete rotation of the rotor, each of the three working chambers formed by the housing and the rotor completes a four stroke cycle as discussed above.

To control combustion of the air/fuel mixture within a rotary engine, it is known to provide recesses within the three peripheral surfaces, or flanks, of the rotor. U.S. Pat. No. 3,606,602 teaches a rotary piston engine having a rotor with a rotor recess formed in each rotor flank. The rotor recess is positioned and bifurcated at its leading end portion so that the rotor recess is simultaneously brought into communication with an inner opening of the ignition plug mounting hole within the cylindrical housing as the ignition plug generates a spark. Such configuration avoids pre-ignition and, thus, increases the overall engine performance. Similarly, U.S. Pat. No. 3,696,796 teaches a rotor of a rotary piston internal combustion engine having a rotor recess in each of the rotor flanks formed by a relatively large and deep depression as well as a relatively narrow and shallow channel. The channel forms a shooting passageway which propels gaseous fluid in the working chamber at a high velocity into the expansion working chamber for accomplishing further fuel combustion. The channel also causes high turbulence and, thus, increased mixing and flame propagation.

U.S. Pat. No. 5,123,387 teaches an insulating plate mounted within a rotor recess in a manner such that an insulating chamber is formed between the insulating plate and the surface of the rotor flank. The insulating plate has a vent hole which forms a communication between the rotor recess and the insulating chamber for preventing differential pressures which would tend to deform the plate.

U.S. Pat. No. 3,288,120 teaches a rotary piston internal combustion engine having a rotor with approximately axially symmetrical rotor recesses. An inlet groove of the recess begins in an area of the trailing end and gets continuously deeper so that the groove, at the tangential termination of discharge into the recess, has the depth of the recess. The inlet groove is relatively wide at the beginning and the width of the inlet groove continuously decreases up to the recess.

U.S. Pat. No. 4,067,670 teaches a rotary engine having a rotor with rotor pockets in which a heat insulating medium is positioned. The pockets are covered. Such configuration provides reduced heat transfer to the rotor and, thus, increases the combustion efficiency. U.S. Pat. No. 4,066,044 teaches a rotor for a rotary combustion engine having an insert attached to the rotor with a tongue and groove fit such that each insert can be slid into position along the tongue and groove fit. Such configuration increases the operating temperature of the working surfaces of the rotor.

U.S. Pat. No. 4,418,663 teaches a rotary engine having a rotor of the radially movable vane type which is eccentrically housed within a rotor chamber. Impeller blades about the periphery of the rotor chamber casing are used to supercharge a fuel mixture prior to such fuel mixture being introduced into volumetrically expandable and contractible combustion chambers positioned about the periphery of the rotor.

U.S. Pat. No. 5,121,721 teaches a rotary engine having a rotor with two side faces. A side housing is positioned to face one of the two side faces of the rotor and a center housing is positioned to face the other side of the rotor. Each of the side housing and the center housing has an intake port. The center housing also has a relief vent in the opening end of the intake port for allowing discharge of pressurized blow-bye gas.

U.S. Pat. No. 4,377,136 teaches a rotary piston engine having exhaust ports within the rotor assembly for ejecting exhaust gases asymmetrical to the rotor axis in order to impart torque to the rotor. U.S. Pat. No. 4,074,614 teaches valving elements which rotate and provide fluidic communication for creating positive pressure and for venting such positive pressure from cylinders within an engine.

In a premixed-charge rotary engine, fuel and air are introduced, often after being premixed in a carburetor, through side or peripheral ports located close to bottom dead center (BDC). Combustion occurs around top dead center (TDC) in which position the rotor flank and housing surface are in close proximity. In several places, the distance is small enough so that quenching of the flame occurs. Combustion is then incomplete and unburned fuel will then be emitted through the exhaust. As previously stated, a rotor recess, or pocket, on the rotor flank is provided for the purpose of burning the fuel. In addition, the volume of the pocket also determines the compression ratio of the engine. Numerous pocket designs are taught by Abraham, J., et al., "3-D Computations of Premixed-Charge Natural Gas Combustion in Rotary Engines" SAE Technical Paper Series *910625*, International Congress and Exposition, Detroit, Mich. Feb. 25–Mar. 1, 1991, SAE International, Warrendale, Pa. However, none of these pockets are effective in eliminating the quench zones. In stratified-charge rotary engines, as opposed to premixed-charge rotary engines, this problem is overcome by confining the fuel within the pocket through direct-injection of fuel into the pocket near top dead center. (See Abraham, J., et al., "Pressure Non-Uniformity and Mixing Characteristics in Stratified-Charge Rotary Engine Combustion", SAE Technical Paper Series 880624, International Congress and Exposition, Detroit, Mich., Feb. 29–Mar. 4, 1988, SAE International, Warrendale, Pa.) In the premixed-charge engine, in order to reduce quenching, the pocket must cover a much broader area of the surface of the rotor.

SUMMARY OF THE INVENTION

Accordingly, it an object of this invention to provide a premixed-charge rotary engine in which quenching of the flame is substantially reduced compared to known rotary engines.

It is another object of this invention to provide a premixed-charge engine which provides faster, more complete combustion of the air/fuel mixture.

It is yet another object of this invention to provide a rotor having a pocket recess which covers a substantially broader area of the surface of the rotor than known pocket recesses while still providing complete combustion, faster burning, and reduced quench zones producing reduced unburned hydrocarbons and improved engine efficiency.

These and other objects are achieved by a rotary piston in accordance with one embodiment of this invention for a rotary piston, internal combustion engine, said rotary piston comprising a plurality of contiguous, convex, arcuate peripheral surfaces (rotor flanks) which, in combination with the engine housing, define combustion-working chambers. The rotary piston further comprises a plurality of apex seals and a plurality of side seals disposed between the rotary piston and the engine housing. Each of the convex, arcuate peripheral surfaces defines a convex, arcuate rotor recess, which convex, arcuate rotor recess has a radius greater than the radius of the corresponding arcuate peripheral surface of the rotor. The arc of the rotor recess does not extend from seal to seal of the rotary piston, but rather intersects the arc of the rotor peripheral surface at a distance from the seals. In addition, the rotor recess does not extend from side seal to side seal. Maintenance of these distances from these seals by the rotor recess insures that heat fluxes to the seals are maintained within reasonable limits.

As previously stated, in a premixed-charge rotary engine, it is desirable that the rotor recess cover a substantial amount of the surface of each corresponding rotor flank. In accordance with a preferred embodiment of this invention, each of the convex, arcuate rotor recesses occupies between about 40% and about 80% of each corresponding convex, arcuate peripheral surface of the rotor.

As discussed in the SAE Paper 880624 referenced hereinabove, known rotary engines typically have an adverse pressure gradient which results in a loss in efficiency. In addition to reducing quenching, the use of the arc of a circle to generate the rotor recess in accordance with one embodiment of this invention results in the formation of a throat at the intersection of the minor axis of the housing and the housing when the rotor is near the top dead center position. This throat results in the generation of a squish jet flow from one side of the pocket to the other, increasing mixing and, thus, the burning rate. In dual spark plug housings, where one plug is located after the minor axis and the other plug before the minor axis, the timing of the sparks may be adjusted to create a favorable pressure gradient in the rotary engine.

DESCRIPTION OF THE DRAWINGS

These and other objects and features of this invention will be better understood from the following detailed description taken in conjunction with the drawings wherein:

FIGS. 1*a*–1*f* show a schematic diagram of the basic operation of a rotary engine;

FIG. 2 is a schematic diagram showing a portion of a rotary engine rotor and housing in which the rotor is in the top dead center position;

DESCRIPTION OF PREFERRED EMBODIMENTS

Figure 3:
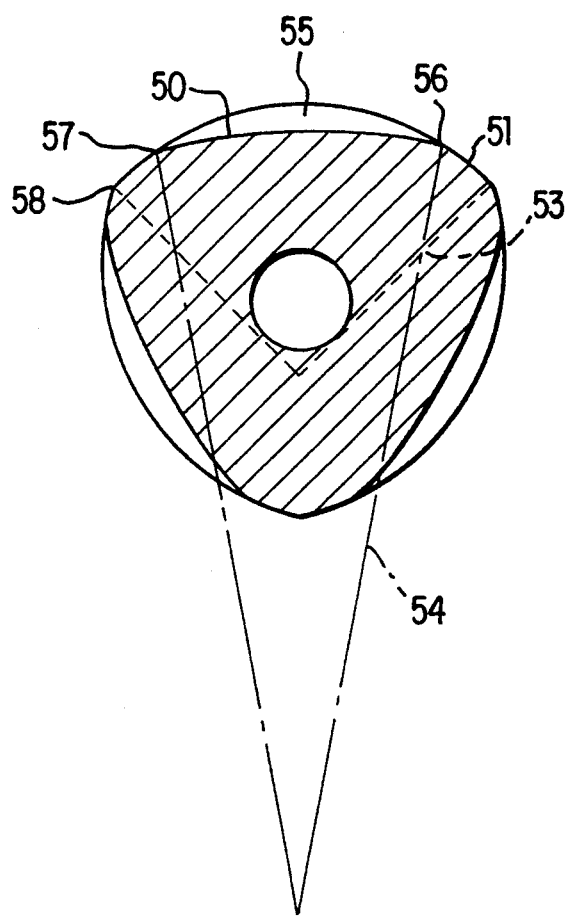
FIG. 3 is a schematic diagram showing the relationship between the rotor peripheral surface and the rotor recess in accordance with one embodiment of this invention.

The basic operation of a rotary engine is shown in FIGS. 1*a*–1*f*. The rotary engine shown in FIGS. 1*a*–1*f* is a four stroke, one cycle engine which continuously performs four strokes of intake, compression, expansion and exhaustion. In FIG. 1*a*, intake port 15 opens to permit entry of the fuel/air mixture into working chamber 17 defined between rotor 10 and housing 12. As rotor 10 rotates as shown by movement of apex seal 11 in FIGS. 1a and 1b, the volume of working chamber 17 gradually increases, reaching a maximum value indicated by element 23 as shown in FIG. 1d. As rotor 10 continues to rotate, as shown in FIG. 1e, intake port 15 automatically closes. As working chamber 17 gradually increases in volume, the air/fuel mixture in working chamber 18 undergoes compression and is ignited by dual spark plugs 13 disposed on both sides of minor axis 14 when rotor 10 is positioned as shown in FIG. 1c. After ignition near the compression top dead center, 20, 21, the working chamber containing the ignited air/fuel mixture expands as shown in FIGS. 1d-1f f, elements 22, 26 and 28. Exhaust gases within the working chamber, elements 24 and 25 in FIGS. 1d and 1e, are exhausted by the exhaust stroke through exhaust port 16. Until one of the working chambers completes the four strokes starting with FIG. 1a, the strokes illustrated in FIGS. 1a-1f are repeated three times, which in turn means that the rotor rotates once while the output shaft rotates three times. In addition, the other two working chambers will respectively complete the four strokes once during this period. This means that a total of three ignitions of fuel/air mixture occur in the same period.

FIG. 2 is a schematic diagram showing one of the peripheral rotor surfaces 43 in a top dead center position with respect to housing 42, in which position combustion of the fuel/air mixture occurs in a premixed-charge rotary engine. Due to the close proximity of rotor peripheral surface 43 to the inside surface of housing 42, the distance is small enough so that quenching of the flame within the working chamber disposed between rotor peripheral surface 43 and the inner surface of housing 42 may occur. Such quenching normally occurs in quench zones designated by reference numerals 40 and 41. As a result of the quenching, the combustion of the fuel/air mixture is incomplete and unburned fuel will be emitted through the exhaust.

To promote combustion of the fuel, in a rotary engine, it is known to provide a pocket or recess on the rotor face. The volume of the pocket, in addition to promoting combustion of the fuel, determines the compression ratio of the engine. However, none of the known pockets are effective in eliminating the quench zones. In a stratified-charge rotary engine, this problem is overcome by confining the fuel within the pocket through direct injection of fuel into the pocket near top dead center. In a premixed-charge engine, in order to reduce quenching, the pocket must cover a much broader area of the surface of the rotor.

Figure 4A:
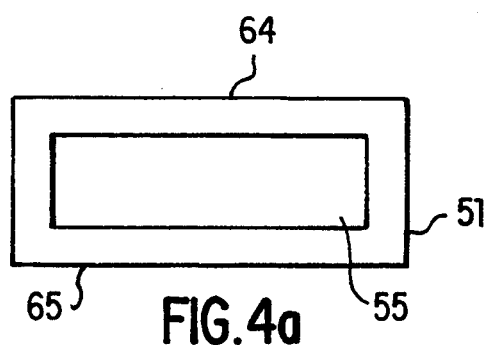
FIGS. 4*a*, 4*b* and 4*c* are plan views of a peripheral surface of a rotor showing the disposition of the rotor recess in accordance with three embodiments of this invention.
Figure 4B:
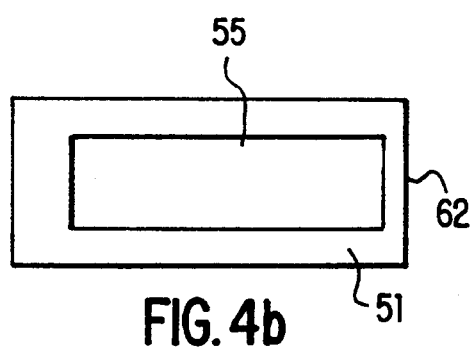
Figure 4C:
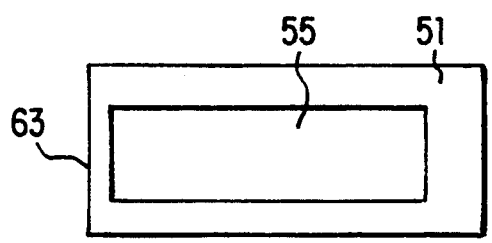

Such a rotor recess is constructed in accordance with one embodiment of this invention as shown in FIG. 3. In particular, the rotary piston in accordance with this invention comprises a plurality of contiguous, convex, arcuate peripheral surfaces 51. Said contiguous, convex, arcuate peripheral surface 51 has a radius 53. In accordance with this invention, rotor recess 55 is formed in peripheral surface 51 by using arc 50 of a circle having a radius 54 which is greater than the radius of the circle formed by arcuate peripheral surface 51 of the rotor. As shown in FIG. 3, the arc formed by arcuate peripheral surface 51 intersects arc 50 which forms arcuate rotor recess 55 at a distance from apex seals 52, 58. In addition, as shown in FIGS. 4a–4c, rotor recess 55 in accordance with this invention does not extend from side 64 to side 65 of the rotary piston. These distances from the seals 52, 58 and sides 64, 65 insure that heat fluxes to the seals are maintained within reasonable limits.

In addition to reducing quenching, the use of arcuate rotor recess 50 to generate rotor recess 55 results in the formation of a throat at the intersection of minor axis 14 as shown in FIG. 1a and housing 12 when rotor 10 is near the top dead center position. This throat results in the generation of a squish jet flow from one side of the recess to the other, thereby increasing mixing and the burning rate. In dual spark plug housings, where one of plugs 13 is located before the minor axis and the other is located after the minor axis, the timing of the sparks may be adjusted to create a favorable pressure gradient in the rotary engine.

As previously indicated, the distances of the intersections of the arcs formed by the arcuate peripheral surface of the rotor and the arcuate rotor recess from the edges of the arcuate peripheral surfaces of the rotor are important for insuring that heat fluxes to the seals are maintained within reasonable limits. In general, the distances of the intersections from the seals will depend on the materials used to make the rotors. An additional factor to be considered in determining the distances of the intersections from the seals is the power of the engine. In particular, the intersections of the arcuate peripheral surface and the arcuate rotor recess are preferably in the range of about 1.5 to about 2.0 centimeters from the seals. For lower power operation, distances at the lower end of this range are preferred and, for higher power operation, distances at the higher end of this range are preferred.

Depending on the engine compression desired, the arcuate rotor recess preferably occupies between about 40% and about 80% of the corresponding convex, arcuate peripheral surface of the rotor. For higher compression engines, said arcuate rotor recess occupies a percentage of the corresponding arcuate peripheral surface of the rotor toward the higher end of this range. Lower compression engines will have arcuate rotor recesses occupying a percentage of the corresponding arcuate peripheral surface of the rotor toward the lower end of this range.

In accordance with one embodiment of this invention, as shown in FIG. 4a, arcuate rotor recess 55 is dimensionally centered within corresponding convex, arcuate peripheral surface 51. However, arcuate rotor recess 55 may be disposed toward the leading edge 62 of convex, arcuate peripheral surface 51 or, alternatively, toward trailing edge 63 of convex, arcuate peripheral surface 51. Such disposition of arcuate rotor recess 55 within convex, arcuate peripheral surface 51 will depend upon the desired combustion characteristics. In particular, disposition of arcuate rotor recess 55 toward leading edge 62 of convex, arcuate peripheral surface 51 produces a squish region within the leading portion of the rotor recess, generating substantial recirculation of air flow within the rotor recess and increasing air in the trailing region thereof to promote combustion therein.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a rotary piston, internal combustion engine having a rotary piston eccentrically mounted for rotation in a multi-lobe, trochoidal-shaped engine housing and defining, with the housing, intake, compression, expansion and exhaust working chambers, each of which vary in volume as the rotary piston rotates within the housing in combination with ignition means for initiating fuel combustion disposed within the housing at a point relative to the direction of rotary piston rotation preceding the lobe junction between the compression and expansion combustion-working chambers, the improvement comprising:

a rotary piston comprising a plurality of contiguous, convex, arcuate peripheral surfaces which, in combination with said engine housing, define said combustion-working chambers;

said rotary piston further comprising a plurality of apex seals and a plurality of side seals disposed between said rotary piston and said engine housing;

each of said convex, arcuate peripheral surfaces defining a convex, arcuate rotor recess, said convex, arcuate rotor recess having a recess radius greater than a peripheral surface radius of said rotary piston; and said convex, arcuate rotor recess comprising a crescent-shaped cross-section.

2. In a rotary piston, internal combustion engine in accordance with claim 1, wherein each said convex, arcuate rotor recess occupies between about 40% and about 80% of each corresponding said convex, arcuate peripheral surface.

3. In a rotary piston, internal combustion engine in accordance with claim 1, wherein said convex, arcuate rotor recess has a generally rectangular shape, the edges of said convex, arcuate rotor recess being between about 1.5 cm and about 2.0 cm in distance from said apex seals and said side seals.

4. In a rotary piston, internal combustion engine in accordance with claim 1, wherein each said convex, arcuate rotor recess is dimensionally centered within each corresponding said convex, arcuate peripheral surface.

5. In a rotary piston, internal combustion engine in accordance with claim 1, wherein each said convex, arcuate rotor recess is disposed toward a leading edge of said convex, arcuate peripheral surface.

6. In a rotary piston, internal combustion engine in accordance with claim 1, wherein each said convex, arcuate rotor recess is disposed toward a trailing edge of said convex, arcuate peripheral surface.

* * * * *